United States Patent
Esponda

(10) Patent No.: US 11,640,422 B2
(45) Date of Patent: May 2, 2023

(54) MACHINE RESOLUTION OF MULTI-CONTEXT ACRONYMS

(71) Applicants: Atlassian Pty Ltd, Sydney (AU); Atlassian, Inc., San Francisco, CA (US)

(72) Inventor: Sebastian Esponda, Sydney (AU)

(73) Assignees: ATLASSIAN PTY LTD., Sydney (AU); ATLASSIAN US, INC, San Francisco, CA (US)

(*) Notice: Subject to any disclaimer, the term of this patent is extended or adjusted under 35 U.S.C. 154(b) by 85 days.

(21) Appl. No.: 16/230,193

(22) Filed: Dec. 21, 2018

(65) Prior Publication Data
US 2020/0201898 A1 Jun. 25, 2020

(51) Int. Cl.
*G06F 16/38* (2019.01)
*G06F 16/33* (2019.01)
*G06F 40/242* (2020.01)
*G06F 40/295* (2020.01)

(52) U.S. Cl.
CPC .......... *G06F 16/38* (2019.01); *G06F 16/3344* (2019.01); *G06F 40/242* (2020.01); *G06F 40/295* (2020.01)

(58) Field of Classification Search
CPC ...... G06F 16/38; G06F 16/3344; G06F 9/242; G06F 21/295
USPC ........................................................ 707/736
See application file for complete search history.

(56) References Cited

U.S. PATENT DOCUMENTS

| | | | | |
|---|---|---|---|---|
| 8,122,022 B1* | 2/2012 | Baker | .................. | G06F 16/313 707/758 |
| 9,153,239 B1* | 10/2015 | Postelnicu | .............. | G10L 25/18 |
| 10,339,150 B1* | 7/2019 | Silk | .................. | G06F 16/24578 |
| 2003/0139921 A1* | 7/2003 | Byrd | ..................... | G06F 40/289 704/10 |
| 2005/0289109 A1* | 12/2005 | Arrouye | .................. | G06F 16/14 |

(Continued)

OTHER PUBLICATIONS

Welcome to our Acronym Attic, "Abbreviations and Acronyms Dictionary", https://www.acronymattic.com/, Dated Apr. 1, 2019, 2 pages.

(Continued)

*Primary Examiner* — Ashish Thomas
*Assistant Examiner* — Abdullah A Daud
(74) *Attorney, Agent, or Firm* — Brownstein Hyatt Farber Schreck, LLP

(57) ABSTRACT

Technologies for creating a digital link between an acronym in an electronic document and a definition that is retrievable by an online system include receiving digital data that includes the acronym and a current usage context; where the acronym and the current usage context form an acronym-usage context pair; creating, as digital output in response to the digital data, a link between the acronym-usage context pair and the definition; where a similarity metric is used to select the definition from different stored definitions of the acronym; where the similarity metric is determined by computer program instructions mathematically comparing the current usage context to usage context data of at least one of the different stored definitions of the acronym; where the link is traversable to cause display of the definition on a display device in response to a display of the acronym on the display device.

22 Claims, 7 Drawing Sheets

(56) References Cited

U.S. PATENT DOCUMENTS

| | | | | |
|---|---|---|---|---|
| 2007/0174045 A1* | 7/2007 | Kao | ...................... | G06F 40/295 704/4 |
| 2008/0161652 A1* | 7/2008 | Potts | ...................... | G16H 50/20 600/300 |
| 2012/0084076 A1* | 4/2012 | Boguraev | ............. | G06F 40/274 704/9 |
| 2012/0109974 A1* | 5/2012 | Feng | ...................... | G06F 40/284 707/E17.089 |
| 2012/0191745 A1* | 7/2012 | Velipasaoglu | ...... | G06F 16/3322 707/E17.074 |
| 2013/0110500 A1* | 5/2013 | Feng | ....................... | G06F 40/40 704/9 |
| 2013/0218885 A1* | 8/2013 | Satyanarayanan | ... | G06Q 30/016 707/728 |
| 2014/0222816 A1* | 8/2014 | Chen | .................. | G06F 16/3335 707/737 |
| 2014/0344263 A1* | 11/2014 | Dhamdhere | ........ | G06F 16/3338 707/E17.084 |
| 2015/0127466 A1* | 5/2015 | Zhu | .................... | G06Q 30/0254 705/14.66 |
| 2015/0227505 A1* | 8/2015 | Morimoto | ............... | G06F 40/30 704/9 |
| 2016/0070792 A1* | 3/2016 | Yuan | .................... | H04L 65/403 707/770 |
| 2018/0196921 A1* | 7/2018 | Devarakonda | ............ | G06N 5/04 |
| 2018/0270261 A1* | 9/2018 | Pande | .................... | G06N 20/00 |
| 2019/0026466 A1* | 1/2019 | Krasser | .................... | G06N 3/08 |
| 2019/0171728 A1* | 6/2019 | Wakankar | ......... | G06F 16/90324 |

OTHER PUBLICATIONS

Acronyms and Abbreviations, https://acronyms.thefreedictionary.com/, last viewed on Apr. 1, 2019, 2 pages.

Abbreviations and Acronyms Dictionary, https://www.acronymfinder.com/, last viewed on Apr. 1, 2019, 3 pages.

\* cited by examiner

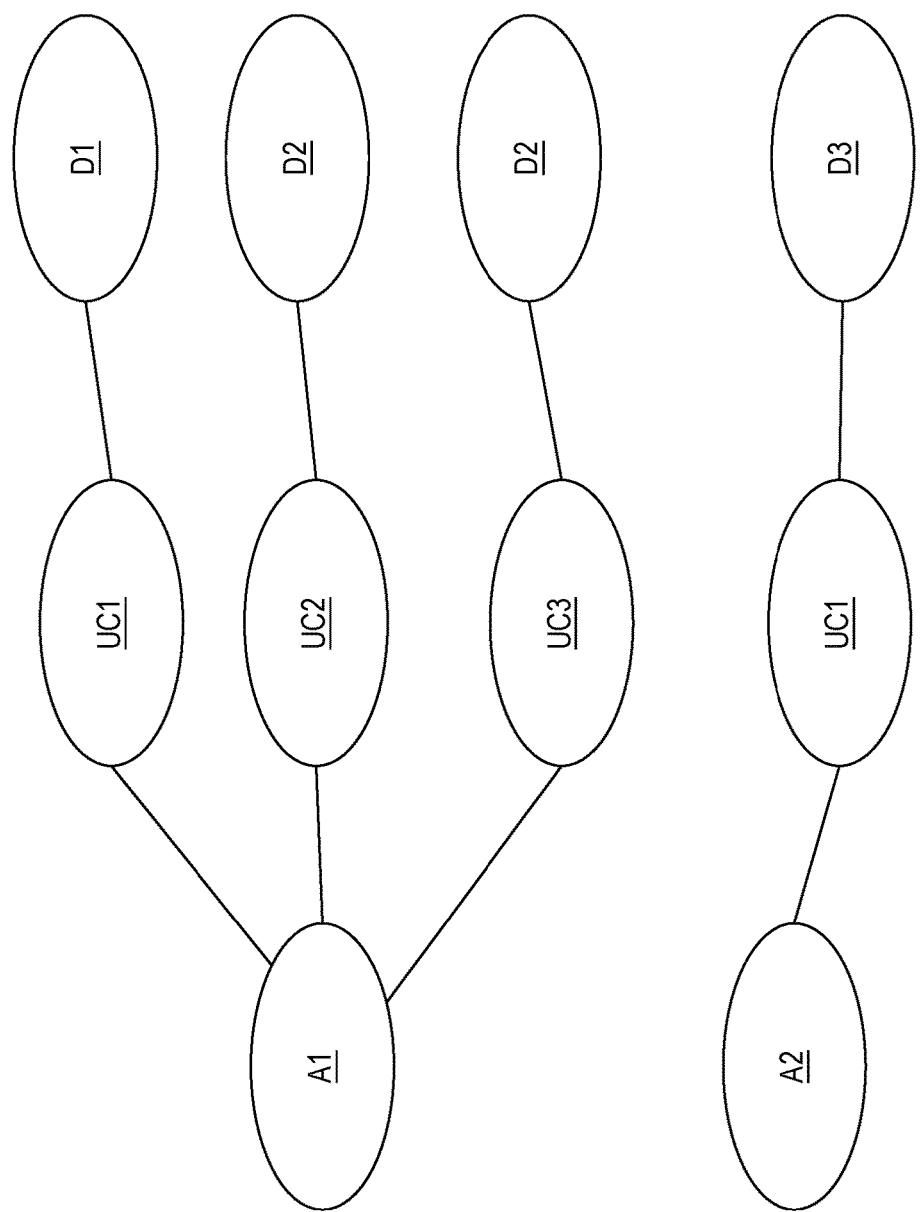

MACHINE RESOLUTION OF MULTI-CONTEXT ACRONYMS

FIELD OF THE DISCLOSURE

One technical field of the present disclosure is content sharing computer systems. Another technical field is computer systems for resolving multi-context acronyms.

BACKGROUND

The developments described in this section are approaches that could be pursued, but not necessarily approaches that have been previously conceived or pursued. However, unless otherwise indicated, it should not be assumed that any of the developments described in this section qualify as prior art, or that these developments are generally known to a person of ordinary skill in the art.

In human language, an acronym or initialism is a form of abbreviation. Abbreviations and acronyms are shortened forms of words or phrases. An acronym is usually made up of the initial letters of a phrase. An abbreviation can be a shortened form of a word or a phrase and is not necessarily made up of the initial letters of the shortened word or phrase.

Online dictionaries can include acronym and abbreviation definitions. ACRONYM FINDER, ACRONYM ATTIC, and THE FREE DICTIONARY by Farlex are searchable dictionaries on the Internet that contain acronym definitions. ACRONYM FINDER is a human-edited abbreviation database. ACRONYM FINDER organizes acronyms by categories and requires the user to manually choose a category before a definition is displayed.

ACRONYM ATTIC provides a search interface to an abbreviation dictionary. ACRONYM ATTIC's search results are ranked by popularity or alphabetically. For example, when "ACM" was typed in the search box on ACRONYM ATTIC, the system returned over a hundred unverified meanings for ACM, sorted alphabetically by default.

THE FREE DICTIONARY by Farlex works similarly to ACRONYM ATTIC in that its search tool returns all of the definitions for an acronym in its database, but additionally provides a category filter pull-down menu that allows a user to manually select a filter for the list of definitions that have been returned for an acronym entered in the search box. To do this, the user is required to select the filter category from a fixed set of options that are presented in a pull-down menu. For example, when a user recently typed "ACM" in the search box on THE FREE DICTIONARY/Acronyms, the system returned over a hundred entries listed alphabetically. Choosing "Most Common" from the Category filter pull down menu shortened the list of search results to less than ten, and the search results were displayed in alphabetical order.

While acronyms have the benefit of brevity in communication, natural language processing as implemented in digital computers can result in errors when acronyms are encountered in digital files that are encoded as character strings or text. Improved techniques are needed to facilitate automatic, programmed, machine recognition of the meaning of acronyms so that electronic documents containing acronyms can be accurately interpreted and used in larger applications.

SUMMARY

The appended claims may serve as a summary of the present invention.

BRIEF DESCRIPTION OF THE DRAWINGS

In the drawings:

FIG. 3A and FIG. 3B are examples of data models, in an embodiment.

Figure 1A:
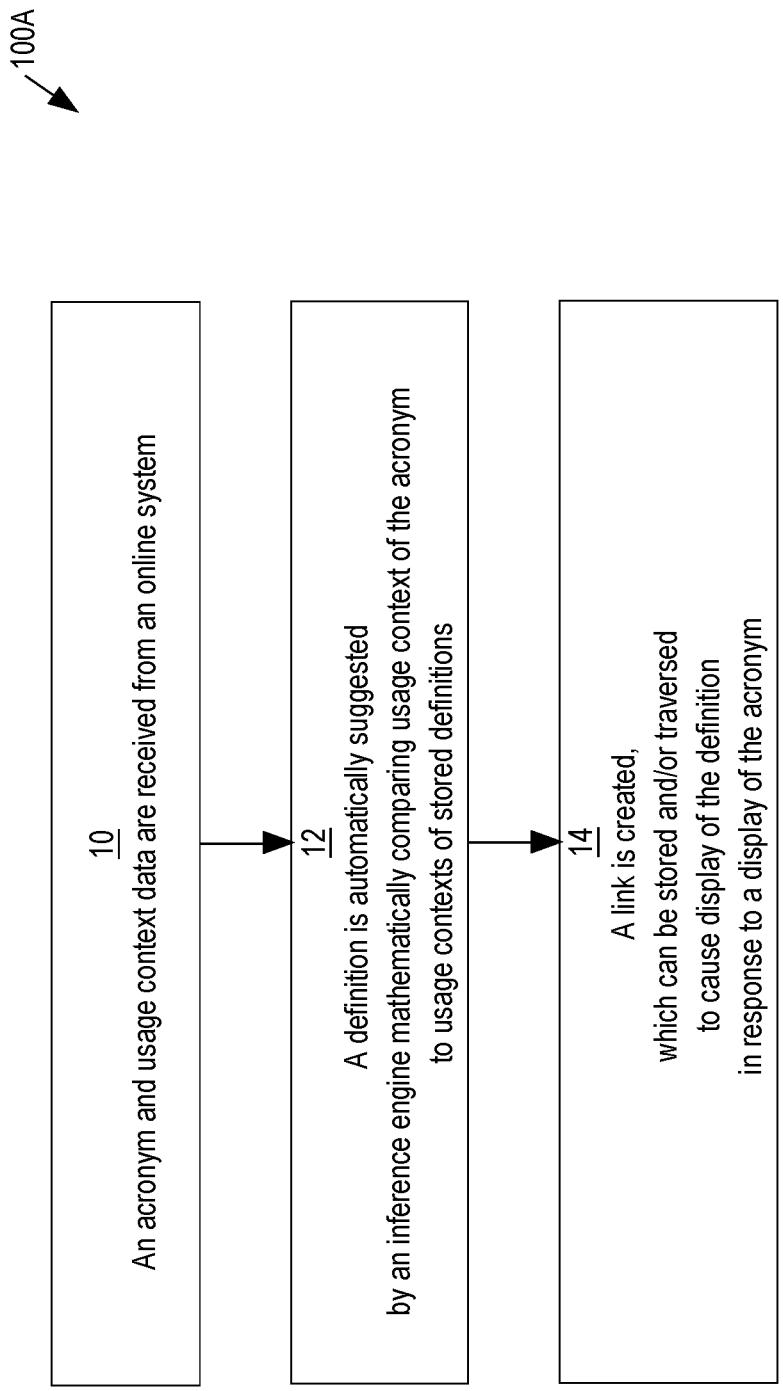
FIG. 1A is a flow diagram of a computer-implemented process that may be used in an embodiment.

While the present invention is amenable to various modifications and alternative forms, specific embodiments are shown by way of example in the drawings and are described in detail. However, the drawings and description are not intended to limit the invention to the forms disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A shortcoming of existing online acronym/abbreviation dictionaries is that they require input to provide context information explicitly in order to determine the most relevant definition for a particular context or application. The disclosed technologies improve upon these prior approaches by automatically inferring the relevant definition based on the context of an application or work process. Thus, the disclosed technologies do not require users to explicitly provide context information in order to suggest a definition for an abbreviation or an acronym that is likely to be relevant to the current context.

One advantage of the disclosed technologies is that they can be integrated with content sharing systems to solve a technological problem that often results from use of those systems. Content sharing systems allow many user computers to create, share, and modify electronic documents, including documents created by other users or user accounts, in a common online system. The electronic documents contain unstructured data; for example data that is freely input, for example typed, drawn, dictated, or cut/copied-and-pasted, by the user into the document as opposed to being entered into a section of an online form that has field-level content and/or formatting restrictions.

When many computers create and store unstructured data in a common or cross-application online system, it is not unusual for the same acronym to be used with meanings in different documents that are stored in the system. For example, in an enterprise-wide content sharing platform, two project teams creating documents in different parts of the system may be using the same acronym with different definitions. However, because the data is unstructured, the system is unaware of the different meanings unless the definitions are explicitly made known to the system.

In the past, content sharing applications have solved this problem by allowing individual users and project teams to create their own personalized or domain-specific online dictionaries. However, this approach does not scale well as it becomes computationally unwieldy for the system to maintain so many individual dictionaries. Additionally, when acronym information is stored in individual user-defined dictionaries, the system is unable to resolve multi-context acronyms at the cross-project or enterprise level.

The disclosed technologies address these challenges by collecting and maintaining context data for specific uses of acronym definitions, analyzing the context data, and using the results of that analysis to suggest the right acronym in response to a new usage context, in computer-implemented processes executing under program control.

The disclosed technologies can be integrated into a content sharing application. Alternatively or in addition, portions of the disclosed technologies can be implemented as a network service, such as a cross-application dictionary service, so that an acronym definition that is correctly inferred and suggested in one vertical application is also suggested in a similar context in a different vertical application.

In an embodiment, links between usage contexts and acronym definitions are maintained so that when an acronym definition is displayed, subject to access/security rules, the links can be traversed to display all of the various usage contexts that are associated with the particular definition. For example, portions of documents in which the acronym's use is intended to refer to a particular definition may be highlighted when a link is traversed. In an embodiment, the disclosed technologies create and maintain acronym definition-usage context links automatically so that the most current usage contexts of the acronyms are captured and outdated usage contexts can be pruned from the dictionary.

While illustrated implementations of the disclosed technologies have been generated for acronym resolution, the disclosed technologies also are applicable to other kinds of entity resolution tasks, including but not limited to abbreviation resolution more broadly, text translation applications and cross-application dictionary and online thesaurus services.

Process Overview

FIG. 1A is an example flow diagram of a process 100A including operations that may be executed by one or more components of a computer network and data flows between the operations. In an embodiment, operations of process 100A are implemented in programmed instructions executed by an online system, such as a content sharing system, a content collaboration system, a project management system, or an issue tracking system. For example, an electronic document is created using the online system, an acronym is detected while a user is creating or editing the document, digital data indicating the current usage context is captured and analyzed, and a context-relevant definition of the acronym is displayed in or adjacent to the use of the acronym in the document on a display screen.

In another embodiment, operations of process 100A are implemented in program instructions executed by a server computer that is coupled to a network. The server computer receives digital data indicating a current usage context from an online system, such as a content sharing application, a content collaboration system, a project management system, or an issue tracking system, via the network. The server computer performs the contextual acronym resolution analysis and sends the context-relevant definition over the network to the online system.

Process 100A creates a digital link between an acronym contained in an electronic document and a definition that is retrievable by an online system. In operation 10, the acronym and current usage context data are received from an online system. In an embodiment, a contextual inference engine receives digital data that includes the acronym and the current usage context. An application program interface (API) may be used to enable data communication between contextual inference engine and the online system.

Operation 10 forms a logical acronym-usage context pair that includes the acronym and the current usage context data. In an embodiment, operation 10 forms the acronym-usage context pair by storing the acronym and items of current usage context data using a feature vector.

Acronyms may be detected automatically, for example by the online system performing a document scan, or in response to input, a programmatic call or other machine signal. In an embodiment, the online system autonomously scans text of a document and uses heuristics to identify and highlight acronyms in the document. For example, the system may scan recently inserted text while the application is in edit mode, looking for a stream of characters that has a particular pattern. In an embodiment, the system detects an acronym if a character pattern includes between one and seven alphanumeric characters, which has at least one letter, starts with an uppercase letter and has at least half of the letters in uppercase. Any suitable patterns for finding acronyms in text may be used and the foregoing is provided only as an example and not to limit the scope of this disclosure.

When an acronym is found, a digital dictionary is searched for existing definitions of the acronym. The digital dictionary is implemented as a searchable database or knowledge base, in an embodiment. In an embodiment, the digital dictionary is implemented as a web-enabled service.

If only one definition for the acronym is found in the digital dictionary, the system suggests the definition without analyzing the current usage context of the acronym. In an embodiment, the definition is suggested by displaying the suggested definition using a pop-up box that is generated and positioned adjacent to the acronym. When multiple definitions are found for the same acronym, usage context is created for the current use of the acronym.

Examples of data items that are included in the current usage context in some embodiments include but are not limited to author/editor data, document metadata, recency data, words or phrases that are adjacent to the acronym in the document. Document metadata may include but is not limited to document title, author or editor name or identifier, date/time stamp of creation or last edit of the document, document location, topic, category. Document location may include but is not limited to folder name, path, project name or identifier, workspace or "space" name or identifier, ticket name or identifier.

In operation 12, process 100A automatically suggests a definition as a result of an inference engine mathematically comparing the current usage determined in operation 10 to usage contexts of definitions of the acronym that are stored in the digital dictionary. In an embodiment, the contextual inference engine analyzes the current usage context using a model that indicates relationships between different acronym-usage context pairs and different stored definitions. In an embodiment, the model is a portion of the digital dictionary that stores acronym definition-usage context pairs. An example of a model is shown in FIG. 3B, described below.

In another embodiment, the model is created using a statistical machine learning process that builds the model by learning mathematical relationships between features of the usage context and corresponding definitions. In an embodiment, the model is trained using a data set that includes previously-determined acronym definition-usage context pairs. The trained model is then used by the inference engine to predict a context-relevant definition for the current use of the acronym.

To compare the current usage context determined in operation 10 to usage contexts of stored definitions of the acronym, computer program instructions of the contextual inference engine compute a similarity metric, which measures the similarity of the current usage context to the stored usage contexts. The similarity metric is used to identify and select the most context-relevant definition from the different stored definitions of the acronym.

The similarity metric is computed by performing pairwise mathematical comparisons of the current usage context to the usage context data of the different stored definitions of the acronym. In an embodiment in which usage context data is stored in feature vectors, the feature vector computed for each usage context represents a point in a multi-dimensional space. The similarity metric is determined by pairing the current usage context feature vector with each stored usage context feature vector and computing a Euclidean distance between the two points of each pair.

In an embodiment, if an acronym is widely used and generates a large number of usage context feature vectors (points in the multi-dimensional space), such that the computational overhead to conduct pairwise similarity comparisons is high, techniques such as smashing points that are very close or clustering algorithms can be used to reduce the number of points in the multi-dimensional space and thereby reduce the number of pairwise comparisons that need to be made.

In operation 14, process 100A creates a digital link, which can be stored and/or traversed to cause display of the context-relevant definition determined by operation 12 in response to a display of the acronym on a display device. In an embodiment, the digital link is created by the contextual inference engine, as digital output in response to the acronym and usage context data received in operation 10. The digital link is a logical association between the acronym-usage context pair and a particular definition of the acronym. The logical association may be implemented, for example, as an edge in a graph-based database or as a table join in a relational database. In an embodiment, the digital link is created in response to identification of the acronym by an automated scan of an electronic document.

Figure 4A:
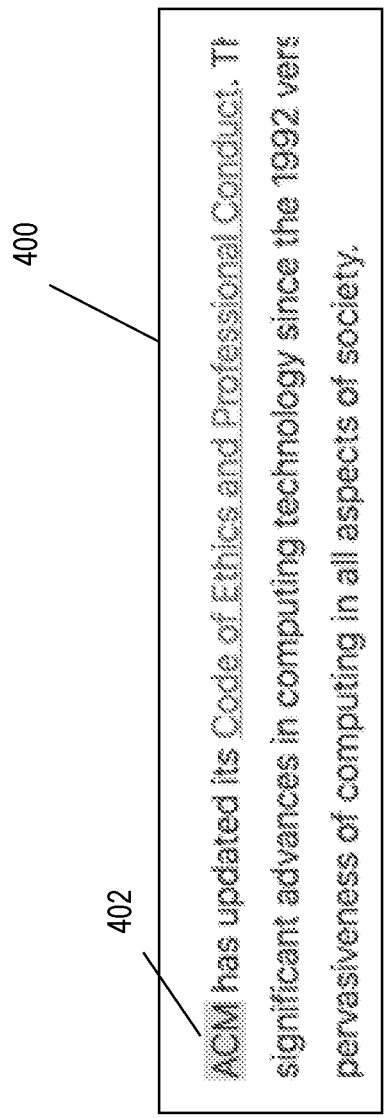
FIG. 4A and FIG. 4B are example screen displays that may be generated and displayed using a computer display device, in an embodiment.
Figure 4B:
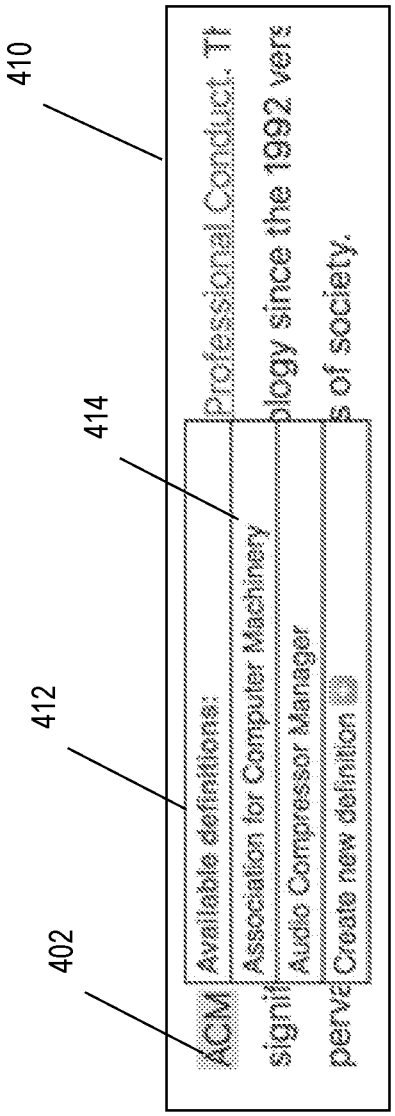

In an embodiment, the digital link is traversable to cause display of the definition on the display device in response to an interaction of an input device with a display of the electronic document. For example, the digital link may be traversed to display the context-relevant definition while input indicates that a user account is creating or editing or hovering over a display of the acronym on a user interface screen. In an embodiment, the similarity metric is computed between the usage context and the usage context data of each of multiple different stored definitions of the acronym, and the different stored definitions of the acronym are then displayed in a ranked order according to the similarity metric. An example implementation of automated acronym detection and display of context-relevant definition is shown in FIG. 4A and FIG. 4B, described below.

In an embodiment, the current usage context is added to the digital dictionary and stored in association with the definition that is determined in operation 12. In an embodiment, the current usage context and corresponding definition are added to the digital dictionary in response to digital input that indicates approval of the definition. That is, in some embodiments, the system waits for an indication of approval before adding a newly inferred definition and usage context pair to the digital dictionary.

Inference Engine

Figure 1B:
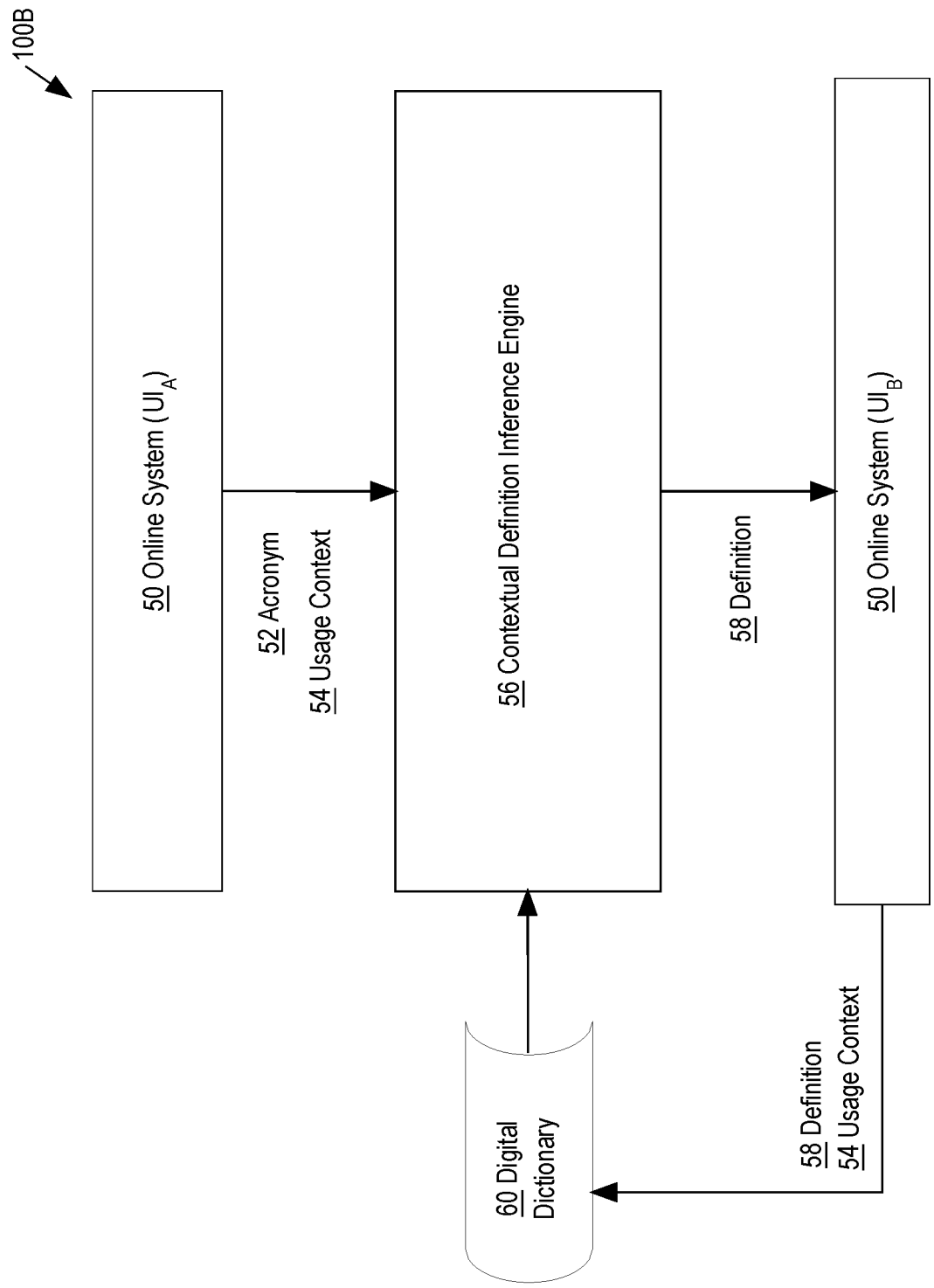
FIG. 1B is a block diagram of a software-based system that may be used to implement an embodiment.

FIG. 1B is a block diagram of a software-based system, in an embodiment. FIG. 1B illustrates data communications between a contextual definition inference engine 56, a digital dictionary 60, and an online system 50. In an embodiment, contextual definition inference engine 56 and digital dictionary 60 are implemented in dictionary service 150 of FIG. 2, described below, and online system 50 is implemented in online service 106 of FIG. 2. Each of the foregoing elements may be implemented as sequences of program instructions organized as programs, methods, subroutines, daemons or other sets of executable instructions.

Contextual definition inference engine 56 is programmed to receive an acronym 52 and a usage context 54 from online system 50, while online system 50 is displaying a first user interface screen, $UI_A$. $UI_A$ is, for example, a document editing screen. Contextual definition inference engine 56 is programmed to execute operations of process 100A, described above, to resolve the acronym definition. In doing so, contextual definition inference engine is programmed to interface with digital dictionary 60 to determine candidate definitions and the associated usage contexts. Contextual definition inference engine 56 is programmed to use the above-described similarity metric to select definition 58 from the candidate definitions and to output definition 58.

Online system 50 is programmed to display definition 58 in a new or modified user interface display screen, $UI_B$. Examples of $UI_A$ and $UI_B$ are shown in FIG. 4A and FIG. 4B, described below. In an embodiment, online system 50 is programmed to update digital dictionary 60 to include definition 58 and usage context 54 after online system 50 receives input that explicitly or implicitly indicates approval of definition 58 for usage context 54. In other embodiments, online system 50 may be programmed to add definition 58 to digital dictionary 60 without approval.

Networked System Example

Figure 2:
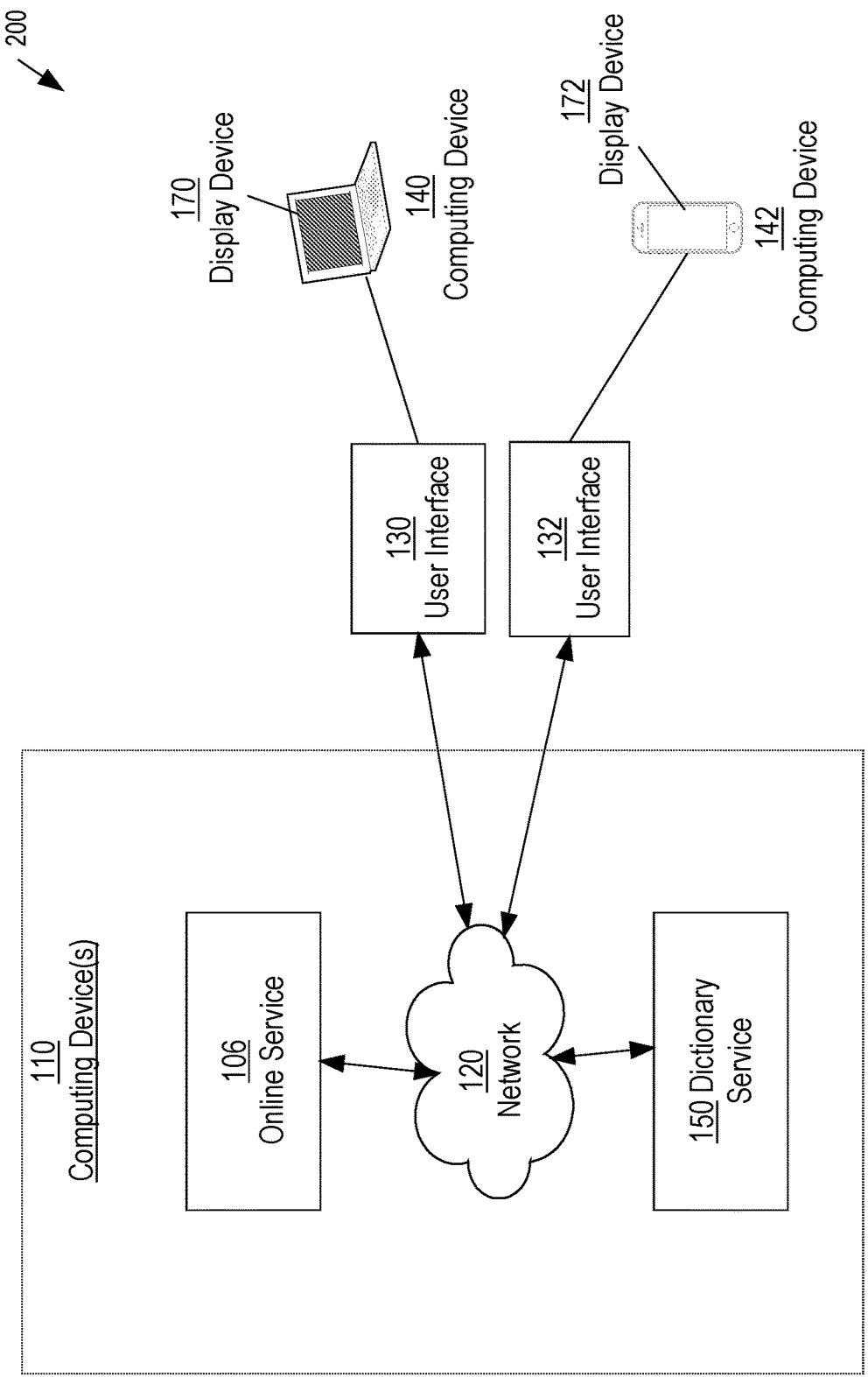
FIG. 2 is a block diagram of a networked computing environment in which an embodiment may be used.

FIG. 2 is an example block diagram illustrating one or more embodiments of a computing system including one or more electronic components in which aspects of the present disclosure may be implemented.

In the embodiment of FIG. 2, computing system 200 includes computing device(s) 110, computing devices 140, 142, display devices 170, 172, which are communicatively coupled to an electronic communications network 120. Implemented in computing devices 110, 140, 142 using computer software, hardware, or software and hardware, are combinations of automated functionality, data structures, and digital data, which are represented schematically in FIG. 2 as online service 106, dictionary service 150, and user interfaces 130, 132. System as used in this disclosure may refer to a single computer or network of computers and/or other devices. Computing device as used in this disclosure may refer to a computer or any other electronic device that is equipped with a processor.

Although computing system 200 may be implemented with any number N (where N is a positive integer) of online service 106, dictionary service 150, user interfaces 130, 132, computing devices 110, display devices 130, 132 and computing devices 140, 142 respectively, in this disclosure, these elements may be referred to in the singular form for ease of discussion.

The example user interfaces 130, 132 are communicatively coupled to computing devices 140, 142, respectively, and to network 120. In some embodiments, computing devices 140, 142 are client computing devices, such as a smart phone or laptop machine, and computing device 110 is a server computer or network of server computers located on the Internet, in the cloud. As illustrated in FIG. 2, display devices 130, 132 are implemented in computing devices 140, 142 but may be implemented as separate devices or as part of other devices, or as multiple networked display devices, in other implementations.

In operation, computing devices 140, 142 operates user interfaces 130, 132 to establish connection(s) over network 120 with online service 106 and/or dictionary service 150, as needed in order to access and use the disclosed technologies, as described in more detail below. For example, user interfaces 130, 132 display context-relevant acronym definitions generated by dictionary service 150 in cooperation with online service 106.

Connection or communicatively coupled as used in this disclosure may refer to a flow of digital information or data communication that is established between two devices on a network by network software communicating with, for example, the devices' operating systems either directly or by a virtual machine. Examples of protocols that may be used to establish network connections include hypertext transfer protocol (HTTP) and secure sockets layer (SSL).

Online service 106 is a content sharing system, in some implementations. Content sharing systems include content collaboration systems, project management systems, and issue tracking systems. Examples of content sharing systems are CONFLUENCE and JIRA, both available from Atlassian Pty Ltd of Australia. Another example of a content sharing system is WIKIPEDIA, provided by Wikimedia Foundation, Inc. Document management systems, content management systems, and social media systems are other types of content sharing systems.

Dictionary service 150 provides access to a digital dictionary and provides contextual resolution of acronym definitions, as disclosed herein. In an embodiment, dictionary service 150 is implemented as a set of software modules that includes an acronym detector and a definition selector. The acronym detector uses regular expressions or templates to search for and detect the presence of acronyms in a user's particular document creation/editing process. Dictionary service 150 also includes a definition selector that, given an acronym and its usage context, finds a definition in the digital dictionary or infers a candidate definition for the acronym from the usage context.

In an embodiment, dictionary service 150 uses an inference agent to infer definitions for acronyms that do not have definitions in the digital dictionary. In an embodiment, the inference agent is implemented as a text processing agent that analyzes words or phrases that appear adjacent to the acronym in the document and builds a definition using the surrounding words or phrases.

In an embodiment, the digital dictionary of dictionary service 150 is implemented using a searchable knowledge base that stores and maintains the acronyms and, for each acronym, a list of usage contexts, and, for each usage context, a linked definition. Where an acronym has multiple definitions, each definition and usage context pair is assigned a confidence value. In an embodiment, the confidence score is binary; for example, the confidence score has a value of 1 if a user has confirmed the definition and usage context pair, and the confidence score has a value of 0 if the definition and usage context pair has not been user-confirmed. In other embodiments, for example when machine learning is used, the confidence score may vary along a continuum, such as between 0 and 1, and thereby indicate a level of confidence in a machine-inferred definition and usage context pair that has not been user-confirmed.

Example Model of Multi-Context Dictionary

Figure 3A:
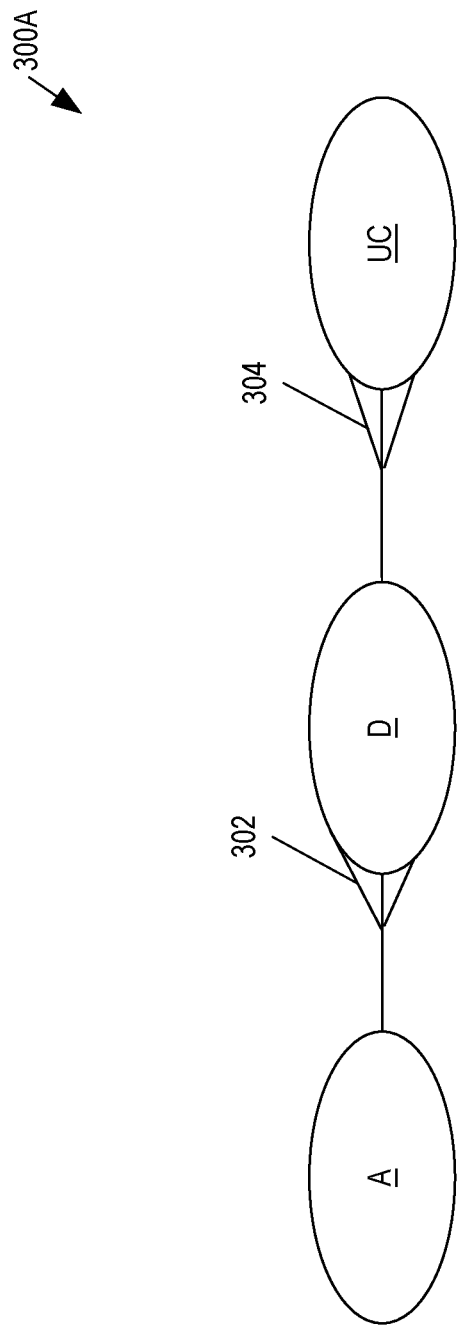

FIG. 3A is a view of an example model 300A of a multi-context dictionary that may be organized and stored using a graph database. In the model 300A, nodes represent data entities, where A is an acronym, D is a definition, and UC is a use case. Edges connecting the nodes represent relationships between the data entities. A an edge with a multi-pronged end 302, 304 represents a one to many data relationship between acronym A and definition D, and a one to many data relationship between a definition D and a usage context UC. For example, a single acronym A can have one or many definitions, and a single definition can be used in one or many usage contexts. When an acronym A has multiple definitions D, the usage context UC most similar to the current usage context is determined and then the model 300A is traversed to determine the most contextually relevant definition.

FIG. 3B is a view of an example model 300B of a multi-context dictionary that may be organized and stored using a graph database. In the model 300B, nodes represent data items and edges represent relationships between data items. Nodes A1 and A2 represent acronyms that have been extracted from electronic documents; for example during an automated scan or during document creation/editing using an online system. Each node A1, A2 is linked to one or more usage context-definition pairs. A usage context-definition pair is represented in model 300B by a usage context node, UCn, a definition node Dn, and an edge connecting the usage context node with the definition node, where n is a positive integer.

Thus, in model 300B, there are two definitions, D1 and D2, of acronym A1 and one definition, D3, of acronym A2. There is one usage context, UC1, associated with definition D1, and that same usage context is also associated with definition D3 of acronym A2. D1 and D3 are two different acronyms used in the same usage context. Also, definition D2 is used in two different usage contexts, UC2 and UC3. The existence of multiple usage contexts and/or a lack of similarity of the usage contexts UC2, UC3, may indicate that definition D2 is a more widely used definition of A1 than definition D1. If the usage contexts UC2 and UC3 are similar, they may be clustered or merged to form a broader usage context that covers both UC2 and UC3.

At least some of the features included in the usage contexts UCn are dependent upon the particular vertical application that is using the multi-context acronym dictionary service, in an embodiment. For example, in a collaborative content editing application, the usage context feature vector may include author name and content logical location, where the content logical location corresponds to a mechanism by which the application organizes documents.

For instance, in CONFLUENCE, a Space is a logical division of content and thus a usage context vector for a version of the acronym dictionary service used by CONFLUENCE may include a Space identifier. However, in JIRA, a logical division of content is referred to as a Project and thus a usage context vector for a version of the acronym dictionary service used by JIRA may include a Project identifier. To operate in a cross-application environment, for example where the acronym dictionary service is used by both CONFLUENCE and JIRA, the feature vector may be parameterized so that the logical location dimension can refer either to a Space or a Project, as needed.

Example Process for On-Demand Acronym Resolution

FIG. 4A and FIG. 4B are example screen displays that may be generated as electronic documents, web pages, dynamic HTML or other output for display on a client computer in an embodiment. FIG. 4A shows an example of a display 400 of unstructured text of an electronic document. In an embodiment, online system 50 is programmed to execute an automated scan for acronyms as described above and has identified "ACM" as an acronym 402. The identification of the acronym 402 is indicated by highlighting in a color that contrasts with the color of the text and the color of the background, in an embodiment. The highlighting allows a user who is viewing or editing the document to verify that the text is intended as an acronym and facilitates the supply of a definition for the acronym.

FIG. 4B shows a modified version 410 of the text display 400 of FIG. 4A, which includes a definition pop-up selector 412. In an embodiment, online system 50 is programmed to cause pop-up selector 412 to be displayed when an acronym is detected and the acronym is determined to be undefined for the current usage context. That is, no entry exists in the digital dictionary for the acronym as used in the current context.

As a result of determining that acronym 402 is undefined for the current context, online system 50 is programmed to search the digital dictionary for candidate definitions and includes in pop-up selector 412 a list of candidate definitions. In an embodiment, the list of candidate definitions is displayed in response to detection of an input that indicates a "hover" or "tap" user interaction with the highlighted acronym.

If, as in FIG. 4B, the list of candidate definitions contains multiple alternatives, the candidate definitions are displayed in rank order so that the definition with the highest probability of being correct, as determined based on the usage context similarity metric, described above, is displayed at the top of the list. A definition 414 is selected from the list in response to detection of an input that indicates a tap on the display of definition 414. Once selected from the list 412, definition 414 and the current usage context are added to the digital dictionary for acronym 402. In the example of FIGS. 4A and 4B, surrounding words such as "computing" and "technology" may be used to infer the correct definition and may be included in the usage context feature vector.

Example Hardware Implementation

According to one embodiment, the techniques described herein are implemented by one or more computing devices. For example, portions of the disclosed technologies may be at least temporarily implemented on a network including a combination of one or more server computers and/or other computing devices. The computing devices may be hardwired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
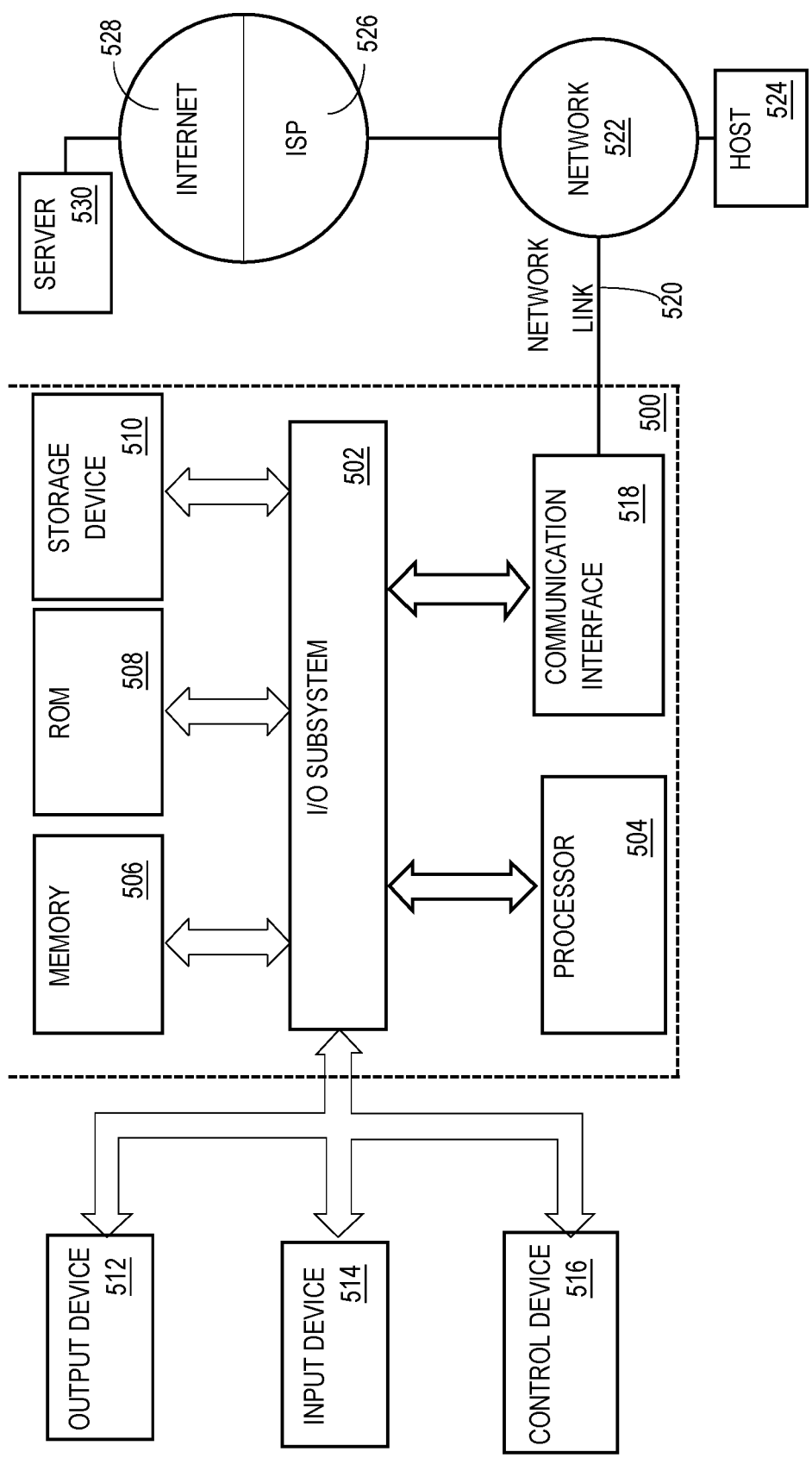
FIG. 5 is a block diagram that illustrates a hardware environment upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

ADDITIONAL EXAMPLES

Illustrative examples of the technologies disclosed herein are provided below. An embodiment of the technologies may include any at least one, and any combination of, the examples described below.

In an example 1, a computer-implemented method for creating a digital link between an acronym in an electronic document and a definition that is retrievable by an online system, includes: receiving digital data that includes the acronym and a current usage context; where the acronym and the current usage context form an acronym-usage context pair; creating, as digital output in response to the digital data, a link between the acronym-usage context pair and the definition; where a similarity metric is used to select the definition from different stored definitions of the acronym; where the similarity metric is determined by computer program instructions mathematically comparing the current usage context to usage context data of at least one of the different stored definitions of the acronym; where the link is traversable to cause display of the definition on a display device in response to a display of the acronym on the display device.

An example 2 includes the subject matter of example 1, where the current usage context is created in response to a retrieval of at least two different stored definitions of the acronym. An example 3 includes the subject matter of example 1 or example 2, where the link is traversable to cause display of the definition on the display device in response to an interaction of an input device with a display of the electronic document. An example 4 includes the subject matter of any of examples 1-3, where the link is created in response to an automated scan of the electronic document that identifies the acronym. An example 5 includes the subject matter of any of examples 1-4, where the current usage context includes at least any one or more of the following: author data, metadata associated with the electronic document, recency data associated with the electronic document. An example 6 includes the subject matter of any of examples 1-5, where the similarity metric is determined by computing a Euclidean distance between the current usage context and usage context data of a stored definition of the acronym.

An example 7 includes the subject matter of any of examples 1-6, where the electronic document is created using, the digital data is received from, and the definition is displayed in any one or more of the following: a content sharing system, a content collaboration system, a project management system, an issue tracking system. An example 8 includes the subject matter of any of examples 1-7, where the method is performed by a server computer that is coupled by a network to, receives the digital data from, and sends the definition over the network to, any one or more of the following: a content sharing system, a content collaboration system, a project management system, an issue tracking system. An example 9 includes the subject matter of any of examples 1-8, where the similarity metric is computed between the current usage context and the usage context data of each of the different stored definitions of the acronym, and the method includes causing display of the different stored definitions of the acronym in a ranked order according to the similarity metric. An example 10 includes the subject matter of example 9, including storing the current usage context in a digital dictionary in association with the definition in response to digital input that indicates user approval of the definition.

In an example 11, one or more non-transitory storage media store instructions which, when executed by one or more computing devices, cause the one or more computing devices to perform operations including: receiving digital data that includes an acronym and a current usage context; where the acronym and the current usage context form an acronym-usage context pair; creating, as digital output in response to digital data, a link between the acronym-usage context pair and a definition; where a similarity metric is used to select the definition from different stored definitions of the acronym; where the similarity metric is determined by computer program instructions mathematically comparing the current usage context to usage context data of at least one of the different stored definitions of the acronym; where the link is traversable to cause display of the definition on a display device in response to a display of the acronym on the display device. An example 12 includes the subject matter of example 11, where the current usage context is created in response to a retrieval of at least two different stored definitions of the acronym. An example 13 includes the subject matter of example 11 or example 12, where the link is traversable to cause display of the definition on the display device in response to an interaction of an input device with a display of the electronic document. An example 14 includes the subject matter of any of examples 11-13, where the link is created in response to an automated scan of the electronic document that identifies the acronym.

An example 15 includes the subject matter of any of examples 11-14, where the current usage context includes at least any one or more of the following: author data, metadata associated with the electronic document, recency data associated with the electronic document. An example 16 includes the subject matter of any of examples 11-15, where the similarity metric is determined by computing a Euclidean distance between the current usage context and usage context data of a stored definition of the acronym. An example 17 includes the subject matter of any of examples 11-16, where the electronic document is created using, the digital data is received from, and the definition is displayed in any one or more of the following: a content sharing system, a content collaboration system, a project management system, an issue tracking system. An example 18 includes the subject matter of any of examples 11-17, where the instructions are performed by a server computer that is coupled by a network to, receives the digital data from, and sends the definition over the network to, any one or more of the following: a content sharing system, a content collaboration system, a project management system, an issue tracking system. An example 19 includes the subject matter of any of examples 11-18, where the similarity metric is computed between the current usage context and the usage context data of each of the different stored definitions of the acronym, and the method includes causing display of the different stored definitions of the acronym in a ranked order according to the similarity metric. An example 20 includes the subject matter of example 19, where the instructions, when executed by the one or more computing devices, cause the one or more computing devices to perform operations including storing the current usage context in a digital dictionary in association with the definition in response to digital input that indicates user approval of the definition.

GENERAL CONSIDERATIONS

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A computer-implemented method comprising:
   receiving an electronic document comprising at least one acronym;
   analyzing digital data of the received electronic document for identifying an acronym of the at least one acronym in the electronic document;
   determining a total number of definitions in a set of existing definitions corresponding to the acronym, the set of existing definitions stored in a database;
   in accordance with a determination that the total number of definitions in the set of existing definitions is a single existing definition:
      causing display of a definition window overlaying the electronic document in a proximity of the acronym; and
      causing the definition window to display a selectable link to the single existing definition; and
   in accordance with a determination that the total number of definitions in the set of existing definitions is multiple existing definitions:
      identifying a current usage context in which the acronym is used in the electronic document to form an acronym-usage context pair, the current usage context comprising at least two or more of: words or phrases that are adjacent to the acronym, a project team associated with the electronic document, and information regarding an author of the electronic document;
      based on the formed acronym-usage context pair, determining a similarity metric between the current usage context comprising the words or phrases adjacent to the acronym in the electronic document and the one or more stored usage contexts of the set of existing definitions that corresponds to the acronym;
      using determined similarity metrics, identifying a subset of context-relevant definitions from the set of existing definitions;
      causing display of a definition selector window overlaying the electronic document within a predetermined proximity of the acronym; and
      causing the definition selector window to display multiple entries, each entry comprising a selectable link to a respective context-relevant definition of the subset of context-relevant definitions.

2. The computer-implemented method of claim 1, wherein the selectable link associated with the context-relevant definition or the single existing definition is traversable to cause display of the context-relevant definition on a display device in response to an interaction of an input device.

3. The computer-implemented method of claim 1, wherein the definition selector window is created in response to an automated scan of the electronic document that identifies the acronym.

4. The computer-implemented method of claim 1, wherein the current usage context further comprises metadata of the electronic document or recency data.

5. The computer-implemented method of claim 1, wherein the similarity metric is determined by computing a Euclidean distance between the current usage context and the one or more stored usage contexts.

6. The computer-implemented method of claim 1, wherein the electronic document is created using the digital data received from one or more of a content sharing system, a content collaboration system, a project management system, or an issue tracking system, and wherein the context-relevant definition is displayed in any one or more of the content sharing system, the content collaboration system, the project management system, or the issue tracking system.

7. The computer-implemented method of claim 1, wherein the computer-implemented method is performed by a server computer that is coupled to a network to receive the digital data from any one or more of a content sharing system, a content collaboration system, a project management system, or an issue tracking system, and send the context-relevant definition over the network to any one or more of the content sharing system, the content collaboration system, the project management system, or the issue tracking system.

8. The computer-implemented method of claim 1, wherein:
   the similarity metric is computed between the current usage context and the one or more stored usage contexts of each of the set of existing definitions; and the computer-implemented method further comprises causing display of, within the definition selector window, the set of existing definitions in a ranked order according to the similarity metric.

9. The computer-implemented method of claim 8, further comprising storing the current usage context in a digital dictionary in association with the context-relevant definition in response to a digital input that indicates user approval of the context-relevant definition.

10. One or more non-transitory storage media storing instructions which, when executed by one or more computing devices, cause the one or more computing devices to perform operations comprising:
receiving an electronic document comprising at least one acronym;
analyzing digital data of the received electronic document for identifying an acronym of the at least one acronym in the electronic document;
determining a total number of definitions in a set of existing definitions corresponding to the acronym, the set of existing definitions stored in a database;
in accordance with a determination that the total number of definitions in the set of existing definitions is a single existing definition:
causing display of a definition window overlaying the electronic document in a proximity of the acronym; and
causing the definition window to display a selectable link to the single existing definition; and
in accordance with a determination that the total number of definitions in the set of existing definitions is multiple existing definitions:
identifying a current usage context in which the acronym is used in the electronic document to form an acronym-usage context pair, the current usage context comprising at least two or more of: words or phrases that are adjacent to the acronym, a project team associated with the electronic document, and information regarding an author of the electronic document;
based on the formed acronym-usage context pair, determining a similarity metric between the current usage context comprising the words or phrases adjacent to the acronym in the electronic document and the one or more stored usage contexts of the set of existing definitions that corresponds to the acronym;
using the determined similarity metric, identifying a subset of context-relevant definition from the set of existing definitions;
causing display of a definition selector window overlaying the electronic document within a predetermined proximity of the acronym; and
causing the definition selector window to display multiple entries, each entry comprising a selectable link to a respective context-relevant definition of the subset of the context-relevant definitions.

11. The computer-implemented method of claim 1, wherein:
the acronym is visually distinguished from surrounding portions of the electronic document; and
the definition selector window is a pop-up window that is positioned proximate to the acronym.

12. The computer-implemented method of claim 1, wherein determining the similarity metrics comprises:
constructing a first feature vector using the current usage context; and
performing a pairwise mathematical comparison between the first feature vector and a second feature vector corresponding to the one or more stored usage contexts.

13. The one or more non-transitory storage media of claim 10, wherein the selectable link associated with the context-relevant definition or the single existing definition is selectable to cause display of the context-relevant definition on a display device in response to an interaction of an input device.

14. The one or more non-transitory storage media of claim 10, wherein the definition selector window is created in response to an automated scan of the electronic document that identifies the acronym.

15. The one or more non-transitory storage media of claim 10, wherein the current usage context further comprises metadata of the electronic document or recency data.

16. The one or more non-transitory storage media of claim 10, wherein the similarity metric is determined by computing a Euclidean distance between the current usage context and the one or more stored usage contexts.

17. The one or more non-transitory storage media of claim 10, wherein the electronic document is created using the digital data received from one or more of a content sharing system, a content collaboration system, a project management system, or an issue tracking system, and wherein the context-relevant definition is displayed in any one or more of the content sharing system, the content collaboration system, the project management system, or the issue tracking system.

18. The one or more non-transitory storage media of claim 10, wherein the instructions are performed by a server computer that is coupled to a network to receive the digital data from any one or more of a content sharing system, a content collaboration system, a project management system, or an issue tracking system, and send the context-relevant definition over the network to any one or more of the content sharing system, the content collaboration system, the project management system, or the issue tracking system.

19. The one or more non-transitory storage media of claim 10, wherein:
the similarity metric is computed between the current usage context and the one or more stored usage contexts of each of the set of existing definitions; and
the instructions further cause the one or more computing devices to perform operations comprising causing display of, within the definition selector, the set of existing definitions in a ranked order according to the similarity metric.

20. The one or more non-transitory storage media of claim 19, wherein the instructions further cause the one or more computing devices to perform operations comprising storing the current usage context in a digital dictionary in association with the context-relevant definition in response to a digital input that indicates user approval of the context-relevant definition.

21. The one or more non-transitory storage media of claim 10, wherein:
the acronym is visually distinguished from surrounding portions of the electronic document; and
the definition selector is a pop-up window that extends from the acronym.

22. The one or more non-transitory storage media of claim 10, wherein for determining the similarity metrics, the instructions further cause the one or more computing devices to perform the operations comprising:
constructing a first feature vector using the current usage context; and performing a pairwise mathematical comparison between the first feature vector and a second feature vector corresponding to the one or more stored usage contexts.

\* \* \* \* \*